(12) United States Patent
Haralampu et al.

(10) Patent No.: US 12,543,828 B1
(45) Date of Patent: Feb. 10, 2026

(54) METHOD FOR PRESERVING MILK FOR JEWELRY PRODUCTION

(71) Applicant: KeepsakeMom Creations Inc., Surrey (CA)

(72) Inventors: Stephen G. Haralampu, Belmont, MA (US); Jefferson Thachuk, Surrey (CA)

(73) Assignee: KeepsakeMom Creations Inc., Surrey (CA)

( * ) Notice: Subject to any disclaimer, the term of this patent is extended or adjusted under 35 U.S.C. 154(b) by 0 days.

(21) Appl. No.: 19/303,142

(22) Filed: Aug. 18, 2025

(51) Int. Cl.
| | |
|---|---|
| *C08H 1/00* | (2006.01) |
| *A44C 27/00* | (2006.01) |
| *C08K 5/098* | (2006.01) |
| *C08K 5/13* | (2006.01) |
| *C08K 5/17* | (2006.01) |
| *C08L 89/00* | (2006.01) |

(52) U.S. Cl.
CPC .............. *A44C 27/001* (2013.01); *C08H 1/00* (2013.01); *C08K 5/098* (2013.01); *C08K 5/13* (2013.01); *C08K 5/175* (2013.01); *C08L 89/005* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 8,671,701 B2 * | 3/2014 | McKendry | A23B 11/102 62/66 |
| 12,049,027 B2 * | 7/2024 | Lew | C08L 63/00 |
| 12,369,596 B2 * | 7/2025 | Luck | B32B 15/085 |
| 2024/0268401 A1 * | 8/2024 | Luck | A23B 11/1455 |

FOREIGN PATENT DOCUMENTS

| | | | | |
|---|---|---|---|---|
| KR | 20190032870 A | * | 3/2019 | A23C 9/206 |
| WO | 2020/243791 A1 | | 12/2020 | |

OTHER PUBLICATIONS

Fu, et al., "Assessment of the Characteristics of Waxy Rice Mutants Generated by CRISPR/Cas9," Frontiers in Plant Science, vol. 13, Jun. 2022.

Luck, et al.,"Freeze-drying your breast milk: safety and nutrition considerations to share with your health provider," milkify, Feb. 2024.

\* cited by examiner

*Primary Examiner* — Peter A Salamon
(74) *Attorney, Agent, or Firm* — Morse, Barnes-Brown & Pendleton, P.C.; Lisa M. Warren, Esq.; Russell L. Widom

(57) ABSTRACT

A method for preserving a milk sample by adding a denaturing/reducing solution to a milk sample to form a first mixture, incubating the first mixture at 50° C. to 100° C. for at least 3 min. to denature and reduce the milk sample, cooling the sample to ambient temperature, adding one or more preservatives and an inert solid material to form a second mixture, and drying the second mixture to form the preserved milk sample. Also disclosed is a dry preserved milk composition and a method for preparing milk-containing jewelry by grinding the preserved milk sample, mixing it with a resin and a hardener, and curing the resin.

24 Claims, No Drawings

METHOD FOR PRESERVING MILK FOR JEWELRY PRODUCTION

BACKGROUND

Breast milk jewelry represents a one-of-a-kind heirloom that celebrates the emotional, everlasting connection between mother and child.

Existing methods for the preparation of breast milk prior to epoxy embedding do not mitigate the potential for subsequent detrimental changes in the final product.

The need exists for methods of preparing breast milk that stabilize against microbial growth, stabilize against potential browning reactions, and preserve a milky appearance.

SUMMARY

To meet the above need, a method for preserving a milk sample is provided. The method includes the steps of (i) adding a denaturing/reducing solution comprising a buffer, a denaturing agent, and a reducing agent to a milk sample to form a first mixture; (ii) incubating the first mixture at 50° C. to 100° C. for at least 3 min to denature and reduce the milk sample; (iii) cooling the denatured reduced milk sample to ambient temperature; (iv) adding to the cooled denatured reduced milk sample one or more preservatives and an inert solid material to form a second mixture; and (v) drying the second mixture, thereby forming the preserved milk sample.

Also provided is a preserved milk sample produced by the above method.

Disclosed is a method for preparing milk-containing jewelry by preparing a preserved milk sample by the above method, grinding the preserved milk sample into a powder, mixing the powder with a resin and a hardener, and curing the resin.

Within the scope of the invention is milk-containing jewelry produced by the method set forth in the preceding paragraph.

Further disclosed is a dry preserved milk composition that includes denatured and reduced milk proteins, one or more preservatives, and one or more inert solid materials in which the one or more preservatives are selected from an antioxidant, an antimicrobial agent, and a chelating agent and the one or more inert solid materials are selected from waxy rice starch, corn starch, microcrystalline cellulose, wheat starch, tapioca starch, potato starch, quinoa starch, pea starch, talc, maltodextrin, titanium dioxide, fumed silica, zirconium silicate, calcium carbonate, and basic lead carbonate.

Finally, a milk-containing jewelry product containing the dry preserved milk composition is also provided.

The details of one or more embodiments of the invention are set forth in the description below. Other features, objects, and advantages of the invention will be apparent from the description and from the claims. All references cited herein are hereby incorporated by reference in their entirety.

DETAILED DESCRIPTION

As summarized above, a method for preserving a milk sample is provided. The sample can be obtained from any mammal. Preferably, the sample is a human breast milk sample.

The method also features adding a denaturing/reducing solution that comprises a buffer, a denaturing agent, and a reducing agent.

The buffer can be, for example, tris(hydroxymethyl) aminomethane (Tris), phosphate, piperazine-N,N'-bis(2-ethanesulfonic acid) (PIPES), N-tris (hydroxymethyl)methyl-2-aminoethanesulfonic acid (TES), or 4-(2-hydroxyethyl) piperazine-1-ethanesulfonic acid (HEPES). Preferably, the buffer is Tris.

The denaturing agent can be, but is not limited to, urea, sodium dodecylsulfate (SDS), sodium dodecylbenzene sulfonate, and guanidine HCl. In a preferred embodiment, the denaturing agent is SDS.

The reducing agent can be one or more of dithiothreitol (DTT), 2-mercaptoethanol, glutathione, sodium cyanoborohydride, dithiobutylamine, and cysteine. In a specific embodiment, the reducing agent is DTT.

Optionally, milk proteins are further stabilized by alkylating reactive groups with one or more of iodoacetic acid, N-ethylmaleimide, a haloacetamide (e.g., iodoacetamide), tris(2-carboxyethyl)phosphine-HCl, acrylamide, methane thiosulfonate, glycidyl ether, and 4-vinylpyridine.

The method also includes a step of adding one or more preservatives and an inert solid material to form a mixture that supports milk solids.

The one or more preservatives are selected from an antioxidant, an antimicrobial agent, and a chelating agent.

The antioxidant can be, but is not limited to, butylated hydroxytoluene (BHT), butylated hydroxyanisole (BHA), tocopherol, or a sulfite salt (e.g., sodium sulfite, sodium bisulfite, sodium metabisulfite, potassium sulfite, and potassium metabisulfite). In a particular embodiment, the antioxidant is BHT.

Antimicrobial agents that can be used in the claimed method include sodium benzoate, sodium hypochlorite, hydrogen peroxide, sodium azide, thymol, and eugenol. Preferably, the antimicrobial agent is sodium benzoate.

The preservative can also be a chelating agent, for example ethylene diamine tetraacetic acid (EDTA), citric acid or a salt thereof, deferoxamine, aspartic acid, and methionine. In an embodiment, EDTA can be used to suppress metal catalyzed degradation reactions, especially with regard to the oxidative degradation of milkfat.

In a particular embodiment of the method, sodium benzoate is added as an antimicrobial preservative, while BHT and EDTA are added to control oxidative reactions.

In addition to adding the preservatives, one or more inert solid materials are added to provide a structural matrix for the milk solids. The inert solid materials can be waxy rice starch, corn starch, microcrystalline cellulose, wheat starch, tapioca starch, potato starch, quinoa starch, pea starch, talc, titanium dioxide, fumed silica, zirconium silicate, calcium carbonate, basic lead carbonate, and maltodextrin. Waxy rice starch is defined herein as rice starch having an amylose: amylopectin ratio of 0-2%. See, e.g., Fu et al., Frontiers in Plant Science 2022, 13:881964. Preferably, the inert solid materials include waxy rice starch and microcrystalline cellulose.

The method set out above requires incubating the milk sample in the denaturing/reducing solution at 50° C. to 100° C. for at least 3 min. (e.g., for 3 min., 5 min., 10 min., 15 min., 20 min., 30 min. or any time between 3 min. and 30 min.) to denature and reduce the milk sample. In a preferred embodiment, the incubating step is carried out at 90° C. for 5 min.

After the incubating step, the sample is cooled to ambient temperature, e.g., 22° C. to 27° C., preferably 25° C.

The method also includes a step in which a mixture of the denatured reduced milk sample, the one or more preservatives, and the inert solid material is dried. This drying step can be performed by any means known in the art, e.g., air drying, drying under vacuum, and lyophilization.

In an embodiment, the drying step is accomplished by lyophilization at a temperature of −20° C. to −196° C. for 16 h to 36 h at a vacuum pressure of 6.7 Pa to 40 Pa (50 mTorr to 300 mTorr) to form the preserved milk sample. For example, the initial sample temperature can be −80° C., and the drying temperature can be about −20° C. under a vacuum of about 13.3 Pa (100 mTorr) with a platen temperature of about 30-40° C.

In a specific method, lyophilization is carried out at −80° C. for 20 h under a vacuum of 13.3 Pa (100 mTorr).

As a result of the drying step, the preserved milk sample has a water activity <0.5, preferably <0.25.

Also within the scope of the invention is a preserved milk sample made by the above-described method. The preserved milk sample prepared by the above method can be used in a method for preparing milk-containing jewelry. The method is accomplished by grinding the preserved milk sample into a powder, mixing the powder with a resin and a hardener, and curing the resin. Any non-yellowing epoxy or acrylic resin and hardener known in the art can be used in the method. Preferably, the resin is an epoxy resin. Desired shapes can be obtained using a mold. Jewelry prepared by this method is also disclosed.

A dry preserved milk composition is disclosed that includes denatured and reduced milk proteins, one or more preservatives, and one or more inert solid materials in which the one or more preservatives are selected from an antioxidant, an antimicrobial agent, and a chelating agent and the one or more inert solid materials are selected from waxy rice starch, corn starch, microcrystalline cellulose, wheat starch, tapioca starch, potato starch, quinoa starch, pea starch, talc, maltodextrin, titanium dioxide, fumed silica, zirconium silicate, calcium carbonate, and basic lead carbonate. A preferred dry preserved milk composition includes denatured and reduced milk proteins, BHT, sodium benzoate, EDTA, waxy rice starch, and microcrystalline cellulose.

Finally, a milk-containing jewelry product is provided that contains the dry preserved milk composition.

Without further elaboration, it is believed that one skilled in the art can, based on the description above, utilize the present invention to its fullest extent. The specific examples below are to be construed as merely illustrative, and not limitative of the remainder of the disclosure in any way whatsoever.

EXAMPLES

Example 1: Preparation of Preserved Milk Sample

Sample Preparation:
Human breast milk samples (1 mL) were aliquoted into a sterile 5 mL screw-top borosilicate glass sample vials. The aliquots were frozen at −80° C. without added preservative.
Preparation of Denaturing Stock Solution:
3.8 g Tris(hydroxymethyl)aminomethane ("Tris") was dissolved in 100 mL of distilled water. The pH was adjusted to 6.8 using HCl. Then 10.0 g sodium dodecyl sulfate ("SDS") was added followed by mixing until fully dispersed. This yielded a 10% SDS/Tris buffer stock used for denaturing the milk sample.
Protein Denaturation and Reduction:
A 1.00 mL aliquot of breast milk in the sample vial was thawed and to it was added 250 µL of the denaturing stock solution and 300 µL of 1 M dithiothreitol ("DTT").

Thermal Denaturation Reduction:
The vial was placed into a dry block heater set at 90° C. and incubated for 5 min. to ensure complete protein unfolding and reduction.
Addition of Antioxidants and Preservatives:
The heated sample was cooled to room temperature (~22-25° C.), after which the following were added to prepare a stabilized milk solution: 10 µL of 0.5M EDTA, 10 µL of 150 mg/mL BHT (prepared by dissolving 1.5 g BHT in 10 mL isopropanol), 10 µL of 300 mg/mL sodium benzoate (prepared by dissolving 3.0 g sodium benzoate in 10 ml distilled water, i.e., 300 mg/mL).
Addition of Opacifying and Structural Additives:
0.25 g waxy rice starch and 0.15 g microcrystalline cellulose were added to the above stabilized milk solution to enhance suspension stability and the mixture shaken vigorously until a homogeneous suspension was achieved.
Lyophilization
The sample was frozen at −80° C. and dried under vacuum for approximately 20 hours to form the preserved milk sample.
Post-Drying Handling:
To store the preserved milk sample for future use, the vial was capped immediately upon removal from the freeze-dryer to avoid moisture uptake. The capped tubes were stored in a desiccator cabinet with calcium sulfate (DRIERITE®) desiccant until further processed.

Example 2: Preparation of Milk-Containing Jewelry

Powder Preparation:
The dried preserved milk sample was ground directly in the vial using a sterile disposable pestle until a fine powder was formed.
Resin Incorporation
The resulting powder was incorporated uniformly into an epoxy or acrylic resin and cast into a mold for forming jewelry. The epoxy or acrylic resin was then cured.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the scope of the following claims.

What is claimed is:
1. A method for preserving a milk sample, the method comprising:
   adding a denaturing/reducing solution comprising a buffer, a denaturing agent, and a reducing agent to a milk sample to form a first mixture;
   incubating the first mixture at 50° C. to 100° C. for at least 3 min to denature and reduce the milk sample;
   cooling the denatured reduced milk sample to ambient temperature;

adding to the cooled denatured reduced milk sample one or more preservatives and one or more inert solid materials to form a second mixture; and drying the second mixture, thereby forming the preserved milk sample.

2. The method of claim 1, wherein the milk sample is human breast milk.

3. The method of claim 1, wherein the buffer is tris (hydroxymethyl) aminomethane (Tris), phosphate, piperazine-N,N'-bis(2-ethanesulfonic acid) (PIPES), N-tris(hydroxymethyl)methyl-2-aminoethanesulfonic acid (TES), or 4-(2-hydroxyethyl) piperazine-1-ethanesulfonic acid (HEPES).

4. The method of claim 1, wherein the denaturing agent is urea, sodium dodecylsulfate (SDS), sodium dodecylbenzene sulfonate, or guanidine HCl.

5. The method of claim 1, wherein the reducing agent is dithiothreitol (DTT), 2-mercaptoethanol, glutathione, sodium cyanoborohydride, dithiobutylamine, or cysteine.

6. The method of claim 1, wherein the one or more preservatives are selected from an antioxidant, an antimicrobial agent, and a chelating agent.

7. The method of claim 6, wherein the antioxidant is butylated hydroxytoluene (BHT), butylated hydroxyanisole (BHA), tocopherol, or a sulfite salt.

8. The method of claim 6, wherein the antimicrobial agent is sodium benzoate, sodium hypochlorite, hydrogen peroxide, sodium azide, thymol, or eugenol.

9. The method of claim 6, wherein the chelating agent is ethylene diamine tetraacetic acid (EDTA), citric acid or a salt thereof, deferoxamine, aspartic acid, or methionine.

10. The method of claim 1, wherein the one or more inert solid materials are selected from waxy rice starch, corn starch, microcrystalline cellulose, wheat starch, tapioca starch, potato starch, quinoa starch, pea starch, talc, maltodextrin, titanium dioxide, fumed silica, zirconium silicate, calcium carbonate, and basic lead carbonate.

11. The method of claim 1, wherein the buffer is Tris; the denaturing agent is SDS; the reducing agent is DTT; the one or more preservatives are BHT, sodium benzoate, and EDTA; and the one or more inert solid materials are waxy rice starch and microcrystalline cellulose.

12. The method of claim 11, wherein the incubating step is performed at 90° C. for 5 min.

13. The method of claim 12, wherein the drying step is carried out by lyophilization at a temperature of −20° C. to −196° C. for 16 h to 36 h.

14. The method of claim 13, wherein the lyophilization is carried out at −80° C. for 20 h.

15. The method of claim 1, wherein the preserved milk sample has a water activity <0.5.

16. The method of claim 14, wherein the water activity is <0.25.

17. The method of claim 1, further comprising adding an alkylating agent to form the first mixture.

18. The method of claim 17, wherein the alkylating agent is a haloacetamide, iodoacetic acid, N-ethylmaleimide, tris (2-carboxyethyl)phosphine-HCl, acrylamide, methane thiosulfonate, glycidyl ether, or 4-vinylpyridine.

19. A preserved milk sample produced by the method of claim 1.

20. A method for preparing milk-containing jewelry, the method comprising:

preparing a preserved milk sample by the method of claim 1;

grinding the preserved milk sample into a powder;

mixing the powder with a resin and a hardener; and curing the resin.

21. The method of claim 20, wherein the resin is an epoxy resin or an acrylic resin.

22. A milk-containing jewelry product produced by the method of claim 20.

23. A dry preserved milk composition, comprising denatured and reduced milk proteins, one or more preservatives, and one or more inert solid materials, wherein the one or more preservatives are selected from an antioxidant, an antimicrobial agent, and a chelating agent and the one or more inert solid materials are selected from waxy rice starch, corn starch, microcrystalline cellulose, wheat starch, tapioca starch, potato starch, quinoa starch, pea starch, talc, maltodextrin, titanium dioxide, fumed silica, zirconium silicate, calcium carbonate, and basic lead carbonate.

24. A milk-containing jewelry product, comprising the dry preserved milk composition of claim 23.

* * * * *